United States Patent Office 3,265,775
Patented August 9, 1966

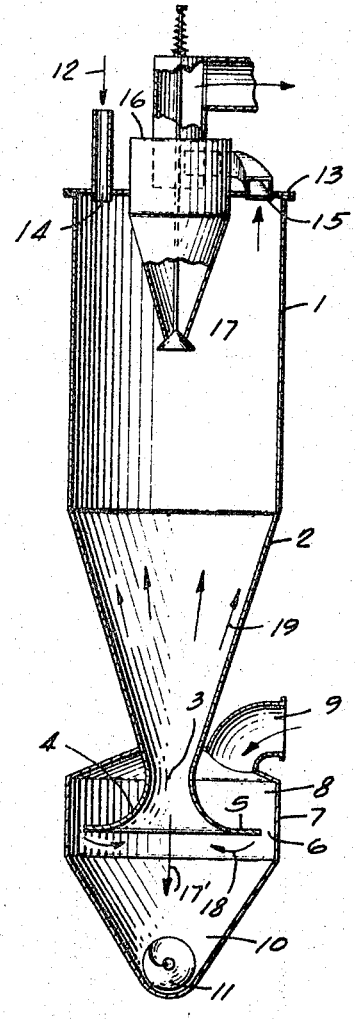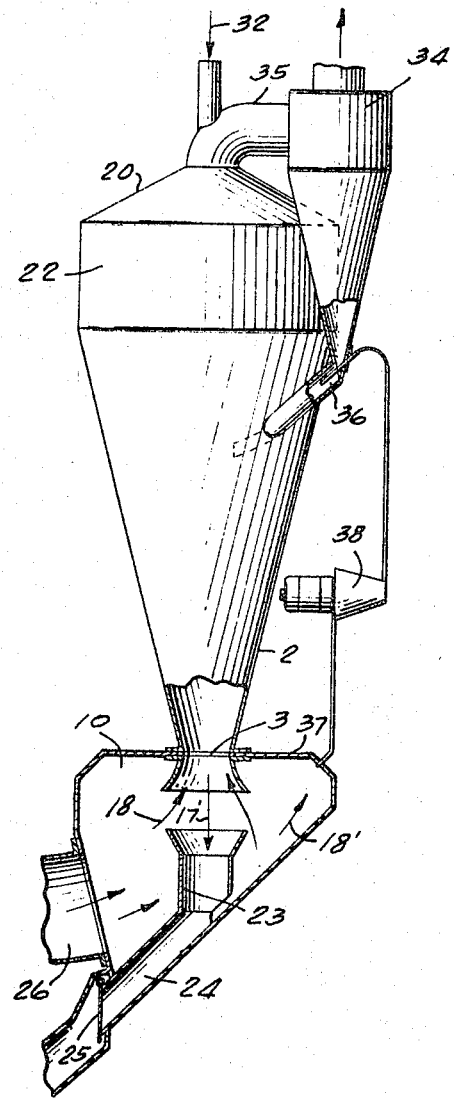

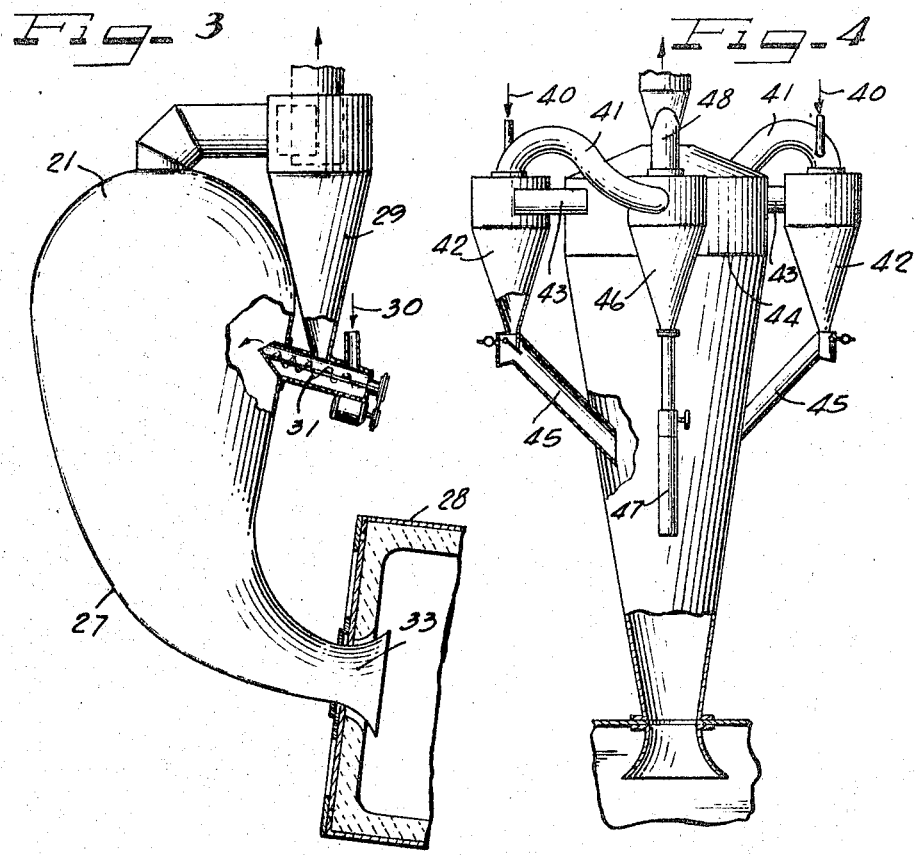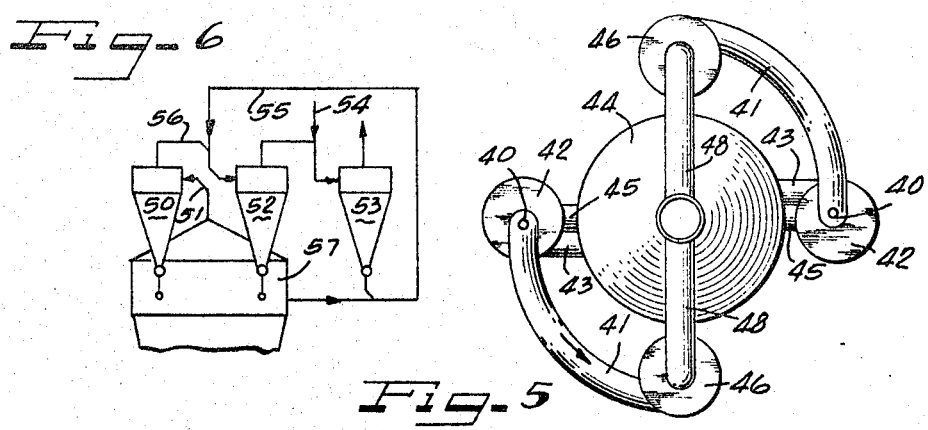

3,265,775
CONTINUOUS TREATMENT OF SUBDIVIDED MATERIAL WITH GAS
Wolfgang Friedrich, Braunschweig, Germany, assignor to Miag Muhlenbau und Industrie G.m.b.H., Braunschweig, Germany, a company of Germany
Filed Feb. 26, 1963, Ser. No. 261,108
Claims priority, application Germany, Feb. 27, 1962, M 51,950
2 Claims. (Cl. 263—53)

The invention relates generally to the treatment of subdivided material such as granular or finely pulverized material and more particularly to a novel method and apparatus for the continuous treatment of such material with a highly compressible fluid or medium.

Where granular or finely pulverized material is to be treated with gas or another highly compressible medium, there are, other than the possibilities of positively conducting the material into perforated containers, various different available forms of treatment:

The material may lie on a gas-permeable base through which the gas may flow. The pressure losses in this case are high and means are required to move the material transversely on the base.

If the flow of gas is made more intensive and/or if the particles are relatively sufficiently light, a well-known fluidized condition is produced which behaves like a fluid for which pipelines and switch members must be provided.

If the operating conditions for a fluidized condition are increased to the extreme, the base can be omitted since the lifting forces obtained from the gas are sufficiently great to support the material.

If the velocity of the gas is equal to the so-called suspension velocity, a steady operating condition is produced in which the particles, provided that they are identical, are held in their position. In this case, only batch operations can be carried out.

If the velocity of the gas is made greater than the suspension velocity, there will result pneumatic conveyance, permitting only treatments of very short time.

It is with consideration of low cost of construction, dependable operation and intensive treatment, possible to carry out in accordance with the invention, a method for the continuous treatment of granular or finely pulverized material in counter flow with gas flowing upwardly within a vessel, the material to be treated being introduced into the vessel at the top thereof. If the amount of material charged per unit of time into a gas which flows upward at greater than the suspension velocity is suitably controlled, there will result particle concentrations which effect a self-controlled emergence of material through the inlet opening traversed by the gas.

The expense of the apparatus for carrying out the method is extremely low, since it consists practically merely of a stand pipe. Dependability in operation is assured for the same reason. The intensity of treatment is high since the material is conducted in counter flow to the gas. However, this is not effected, for example, at gas velocities below the suspension velocity, since the intensity of treatment would be much too slight. Consequently, use is made of the phenomenon that upon increase in the density of the material in the treating stream of gas, there are obtained associations of particles, whereby particles may be located so close to each other that different conditions of flow occur than in the case of particles which are more or less isolated, in the stream of gas. Thus, the flow around the particles may be basically disturbed so that a group of particles or a cloud of particles of special joint flow behavior is formed which, in case of a sufficient density of the material, emerges downward through the inlet opening in opposition to the gas flow. In this connection, a certain inherent control can be observed which results in a non-uniform precipitation of the material in downward direction.

Since the gas, in which the granular or finely pulverized material is suspended, is to flow upward without resolving or eddying, it is advantageous to construct the stand pipe in known manner as a funnel which acts as a diffuser. This also results in the additional advantage of a downward discharge of the material which fluctuates only slightly if at all. Furthermore, the funnel inlet can be curved outward in order to obtain more favorable incoming flow conditions.

If the particle size lies within wide limits, for instance $1\mu$ and $200\mu$, the discharging gas preferably should be conducted through a cyclone which precipitates the entrained material and returns it to the treatment chamber. A plurality of openings for the feeding of material and withdrawal of gas can be provided in the upper portion of the treatment vessel and the cyclone may be arranged centrally therein.

The method and apparatus for carrying it out permit numerous applications, such as, for example, drying moistening, heating, cooling and chemical changes of various type.

Further details of the invention will be explained with reference to the accompanying drawings showing embodiments thereof. In the drawings:

FIGS. 1–4 illustrate in schematic form, vertical cross-sections of embodiments of the invention;
FIG. 5 is a top plan view of the apparatus of FIG. 4; and
FIG. 6 is a connecting diagram for dust precipitators.

Referring to FIG. 1, the apparatus comprises a cylindrical stand pipe 1 having a funnel 2, which is developed in the manner of a diffuser and extends upward from a nozzle 3 which is provided with internal curved flaring 4. The flaring merges into a disc 5 which is surrounded by a cylindrical part 7 forming a small annular gap 6. Above the disc there is formed an annular channel 8 having an inlet conduit 9 for the treatment gas. The part 7 is narrowed by two flat oblique walls which coverge at the bottom into a housing for a discharge worm 11.

The top or cover 13 of the container 1 is provided with openings 14 for the introduction of material in the direction 12 and openings 15 for the discharge of the gas. The last-mentioned openings can be connected to a cyclone 16 which returns the material in the direction indicated by the arrow 17 into the treatment vessel 1 and allows the purified gas to discharge at the top.

The treatment gas passes through the conduit 9 into the annular space 8, passes through the annular opening 6 below the plate 5, and flows, accelerated, in the direction indicated by the arrows 18 to the funnel nozzle 3, then flowing upwardly in the direction indicated by the arrows 19 from below into the stand pipe 1. The pulverized or granular material introduced through the openings 14 falls in opposition to the upward flowing gas, down through the stand pipe 1 toward the bottom of the funnel 2, where it is retarded to a greater or lesser extent which can lead all the way to a standstill or even partially to a reversal of direction. Upon further increase of the particle concentration, particle groups are formed in which the flow behavior of the individual particle is different than that of a particle outside the group of particles. This group of particles then falls in the direction indicated by the arrow 17' in the form of a coherent group or mass through the funnel nozzle 3 into the space 10 below the disc 5. This can take place at gas velocities which may be several to many times greater than the suspension velocity.

The higher the gas velocities in the funnel of the standpipe, the more material can be charged into the apparatus and the more the piles or groups of particles produced can be compressed. It would be theoretically sufficient for the standpipe to consist only of the funnel part, the angle of opening of the funnel depending on the viscosity of the treatment gas, in order to obtain substantially gyration-free retardation of the gas velocity, while the height of the standpipe is theoretically given by the cross-section at which the suspension velocity would be established. Standpipes constructed in such a manner would be very high for carrying out of certain processes. For this reason, the treatment may be shortened in the standpipe and repeated one or more times in such manner that a given quantity of the material is recycled, thus obtaining a considerable reduction in the structural height of the standpipe.

As means for effecting the recycling, there may be used, as already described, a dust precipitator, particularly of the known cyclone construction. When shortening the standpipe it is advisable to construct its upper part as a hood which, in its lower region, has only a slight, if any, change in cross-section, in order to give the flow an opportunity to calm down, while the upper part has a strong constriction in cross-section so as to forcefully bring about a clearly definable behavior of the flow before it leaves the standpipe.

The hood can be developed as shown in FIG. 3 as a semisphere 21 or else as a paraboloid or similarly rounded body. Since the manufacture of such bodies affords difficulties, the hood can also be composed of at least two bodies of developable surface, as shown in FIG. 2. Here the lower part of the hood consists of a cylindrical part 22 and of a cone frustum 20 placed thereon. For certain embodiments the constriction in cross-section can be made infinitely large, whereby the conical frustum 20 becomes a flat disc, as shown at 13 in FIG. 1.

Since it is necessary to prevent the cloud of material which has precipitated out in downward direction through the nozzle 3 of the standpipe funnel and is designated by the arrow 17' in FIG. 1, to be torn apart by the oppositely moving treatment gas 18, not only is the space 10, disposed below the nozzle, preferably made substantially larger in cross-section than the nozzle cross-section, but in addition a collecting hopper 23 (FIG. 2) may be provided which receives the cloud of material that has dropped out and conducts it away, the drop channel 24 shown in FIG. 2 being closed by an ordinary flap 25, if desired, acting against a spring or other restoring force.

If the material treated in the standpipe is to be further treated in a rotary kiln or the like, the material channel 24 shown in FIG. 2 and the gas feed channel 26 can be connected to the head housing of the rotary kiln. A considerably simpler and cheaper structure and one which in particular requires a short structural height can be employed. In this case the standpipe may have its funnel part 27 constructed, as shown in FIG. 3, with a curved axis and the nozzle 33 is extended directly into the rotary kiln 28. The head housing of the rotary kiln can then be dispensed with and the latter provided with a closed end wall which merely has a central opening for the nozzle neck.

The dust precipitators, predominantly cyclones, used to obtain the aforementioned recycling treatment, can be inserted in various manners. The arrangement described in connection with FIG. 1 has the disadvantage that the quantity of return material separated by the cyclone 16 cannot be measured, since it passes directly into the standpipe. Accordingly, the cyclone 29 can also be arranged alongside the standpipe, as shown in FIG. 3. Here the fresh material is in the direction indicated by the arrow 30 added to the recycled material emerging from the cyclone 29 and both portions of material are brought together by the feed worm 31 into the standpipe 21, 27. A conveyor worm of increasing pitch can be used in this connection. In the case of the ordinary cyclone arrangement shown in FIG. 2, the fresh material is fed in the direction of the arrow 32 into the pipe 35 between the standpipe hool 21, 20 and the cyclone 34. The feeding of the material which has been precipitated in the cyclone, is effected by an injector 36 with the gas drawn by the blower 38 from the nozzle box 37 in the direction indicated by the arrow 18'.

The method according to the invention and the apparatus described for carrying it out, are particularly suitable for the thermal preparation of cement material in raw powdered form. In this connection, in order to obtain a sufficient calcining, long times of treatment of the material are required with the result that the recycle quantities are many times larger than the quantities of fresh material. Accordingly the standpipe must cooperate with an extensive dust precipitation system, such as shown in FIG. 4. The fresh material is here charged in the direction indicated by the arrow 40 to the waste gas (exhaust gas) line 41 of the first cyclone 42, which is connected by the tangentially discharging pipe 43 to the side of the hood part 44 of the standpipe. The material carried along out of the standpipe is fed back to the standpipe through the chute 45. The material which is introduced in the direction indicated by the arrow 40 is separated in a second cyclone 46 and also fed to the standpipe in the same manner. In this connection, the feed chute 45 of the primary cyclone 42 and the feed chute 47 of the secondary cyclone can be arranged at different heights as illustrated. The apparatus described is shown as a double system in FIGS. 4 and 5. There is just as readily possible a multiple arrangement in which a large number of cyclones, for instance three, as shown in FIG. 6, can be employed. A parallel connection of several groups of cyclones is possible, for example in multiples of three.

When using three cyclones, as shown in FIG. 6, a primary cyclone 50 is provided which separates the coarse particles carried along by the waste gas stream 51, while the secondary cyclone 52 serves for the separation of the fine particles. A tertiary cyclone 53 assures the drying and pre-heating of the fresh material fed in the direction indicated by the arrow 54. The material separated from it is fed in the pneumatic conveyor line 55 in front of the secondary cyclone 52 into the waste gas line 56 coming from the primary cyclone 50. The gas in conduit 55, which conveys the material separated from the tertiary cyclone 53, is taken from the standpipe 57.

The present invention makes possible the construction of compact treatment units which result particularly in the manufacture of cement, in a greatly shortened rotary kiln with adjacent pre-treater of suitable height.

The apparatus is very simple to control by the quantity of gas drawn through in combination with another variable, for example the temperature of the waste gas behind the last cyclone, as measured for example in the conduit 48 (FIG. 4).

Having thus described my invention it will be obvious to those skilled in the art that various immaterial changes may be made therein without departing from the spirit of the invention, hence I do not wish to be understood as limiting myself to the exact form, construction and arrangement shown and described, or uses mentioned.

I claim:

1. A method for the continuous treatment of granular and finely divided particles of material in a counterflowing highly compressible fluid flowing upwardly in which such material is treated without essential change as to form and weight of the particles, comprising the steps of effecting a continuous flow of the fluid in an upward direction with such fluid rising with decreasing velocity, introducing said material into said fluid flow in a direction counter thereto, continuously maintaining the velocity of said fluid at a rate higher than that required to maintain suspension of the material particles, and controlling the amount of material added per unit of time to the fluid to effect a compression of such material and thereby form successive clouds which reach a density sufficient to fall through an area adjacent the bottom of said fluid flow of maximum fluid velocity to an area adjacent thereto and thereat removing the material from said fluid.

2. A method according to claim 1, comprising the further steps of extracting the material from the gas at accelerated speed after the treatment, and recycling the extracted material in the ascending stream of gas, the quantity of material recycled per unit of time being a multiple of the quantity of fresh material fed during the same period of time.

References Cited by the Examiner

UNITED STATES PATENTS

| | | | |
|---|---|---|---|
| 2,021,034 | 12/1952 | Stecker | 263—21 |
| 2,659,587 | 11/1953 | Bowen | 263—21 |
| 2,785,886 | 3/1957 | Muller | 263—32 |
| 2,857,683 | 10/1958 | Schytil | 34—57 |
| 3,067,990 | 8/1960 | Zacpal | 263—32 |
| 3,102,719 | 5/1961 | Zacpal et al. | 263—32 X |
| 3,118,658 | 1/1964 | Dennert | 263—21 |
| 3,140,862 | 7/1964 | Schoppe | 263—21 |

FREDERICK L. MATTESON, Jr., *Primary Examiner.*

JOHN J. CAMBY, CHARLES SUKALO, *Examiners.*

D. A. TAMBURRO, *Assistant Examiner.*